(12) United States Patent
Ting

(10) Patent No.: US 12,275,418 B2
(45) Date of Patent: Apr. 15, 2025

(54) VEHICLE POSITIONING ABNORMALITY INSPECTION METHOD AND CAR COMPUTER

(71) Applicant: WISTRON CORP., New Taipei (TW)

(72) Inventor: Tung-Sheng Ting, New Taipei (TW)

(73) Assignee: WISTRON CORP., New Taipei (TW)

( * ) Notice: Subject to any disclaimer, the term of this patent is extended or adjusted under 35 U.S.C. 154(b) by 266 days.

(21) Appl. No.: 18/064,992

(22) Filed: Dec. 13, 2022

(65) Prior Publication Data

US 2024/0046713 A1 Feb. 8, 2024

(30) Foreign Application Priority Data

Aug. 3, 2022 (TW) .................................. 111129058

(51) Int. Cl.
*B60W 50/02* (2012.01)
*B60W 50/04* (2006.01)
*G07C 5/00* (2006.01)
*G07C 5/08* (2006.01)

(52) U.S. Cl.
CPC ...... *B60W 50/0205* (2013.01); *B60W 50/045* (2013.01); *G07C 5/008* (2013.01); *G07C 5/0808* (2013.01)

(58) Field of Classification Search
None
See application file for complete search history.

(56) References Cited

U.S. PATENT DOCUMENTS

| 4,727,492 | A | * | 2/1988 | Reeve | G05D 1/024 |
| | | | | | 702/92 |
| 5,615,116 | A | * | 3/1997 | Gudat | B60K 31/04 |
| | | | | | 318/587 |
| 5,934,407 | A | * | 8/1999 | Shimizu | B62D 6/04 |
| | | | | | 701/41 |
| 2012/0259507 | A1 | * | 10/2012 | Fink | B60C 23/0416 |
| | | | | | 701/32.7 |
| 2015/0343951 | A1 | * | 12/2015 | Kim | G01M 11/064 |
| | | | | | 701/42 |

(Continued)

FOREIGN PATENT DOCUMENTS

| CN | 109523830 | A | * | 3/2019 | ............. | G08B 21/02 |
| CN | 113053112 | A | * | 6/2021 | ........... | G08G 1/0125 |
| CN | 113419258 | A | * | 9/2021 | ........... | G01S 19/396 |

OTHER PUBLICATIONS

Gao; Machine translation of CN-109523830-A; Mar. 2019; espacenet.com (Year: 2019).*

(Continued)

*Primary Examiner* — David P. Merlino
(74) *Attorney, Agent, or Firm* — McClure, Qualey & Rodack, LLP

(57) ABSTRACT

A vehicle positioning abnormality inspection method, performed by a processing device includes: obtaining a plurality of groups of driving data, wherein each of the groups of driving data includes at least three vehicle positions, a steering wheel angle and a vehicle speed, performing a deviation calculation procedure on each of the groups of driving data to obtain a plurality of deviation data, and in response to a sum of the deviation data greater than a tolerance value, outputting an abnormal notification. The present disclosure further proposes a car computer.

18 Claims, 11 Drawing Sheets determining a deviation direction relative to the moving direction according to the steering wheel angle — S331a determining a predicted distance according to the vehicle speed and a time difference between the second vehicle position and the target position — S333a setting the second vehicle position as a reference point, determining the predicted position according to the predicted distance and the deviation direction — S335a

(56) References Cited

U.S. PATENT DOCUMENTS

2017/0255843 A1* 9/2017 Elwart .................... G06T 7/337
2019/0325290 A1* 10/2019 Tong .................... B62D 15/021
2020/0029490 A1* 1/2020 Bertucci ................ G06V 20/58

OTHER PUBLICATIONS

Wang; Machine Translation of CN-113053112-A; Jun. 2021; espacenet.com (Year: 2021).*
Chen; Machine Translation of CN-113419258-A; Sep. 2021; espacenet.com (Year: 2021).*

* cited by examiner (a) (b)

VEHICLE POSITIONING ABNORMALITY INSPECTION METHOD AND CAR COMPUTER

CROSS-REFERENCE TO RELATED APPLICATIONS

This non-provisional application claims priority under 35 U.S.C. § 119(a) on Patent Application No(s). 111129058 filed in Republic of China (ROC) on Aug. 3, 2022, the entire contents of which are hereby incorporated by reference.

BACKGROUND

1. Technical Field

This disclosure relates to a vehicle positioning abnormality inspection method and car computer.

2. Related Art

Generally, vehicles are sent back to manufacturers for repairs or maintenance when encountering the following conditions: the mileage of the vehicle increases by 5,000 kilometers, the dashboard of the vehicle lights up with a warning sign, or an accident happens. Currently, many vehicle manufacturers have begun to sell electric vehicles, and self-driving vehicles are also being developed. However, whether it is a general gasoline vehicle, an electric vehicle or a self-driving vehicle, maintenance is only performed when the above conditions are encountered. In other words, drivers usually only find out that the vehicle has abnormal conditions after the vehicle is under maintenance or even an accident has happened, which means vehicle safety is still insufficient.

SUMMARY

According to one or more embodiment of this disclosure, a vehicle positioning abnormality inspection method, performed by a processing device includes: obtaining a plurality of groups of driving data, wherein each of the groups of driving data includes at least three vehicle positions, a steering wheel angle and a vehicle speed, performing a deviation calculation procedure on each of the groups of driving data to obtain a plurality of deviation data, and in response to a sum of the deviation data greater than a tolerance value, outputting an abnormal notification. The present disclosure further proposes a car computer.

According to one or more embodiment of this disclosure, a car computer includes a controller area network (CAN bus) and a processing device connected to the CAN bus. The CAN bus is configured to obtain a plurality of groups of driving data from a vehicle, wherein each of the groups of driving data includes at least three vehicle positions, a steering wheel angle and a vehicle speed. The processing device is configured to obtain the groups of driving data from the CAN bus, perform a deviation calculation procedure on each of the groups of driving data to obtain a plurality of deviation data, and in response to a sum of the deviation data greater than a tolerance value, output an abnormal notification.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
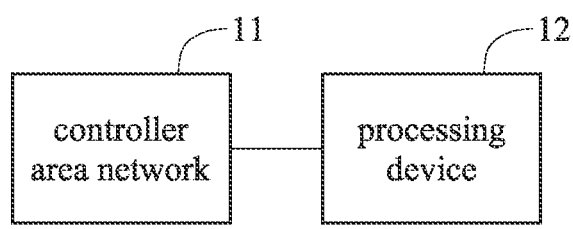
FIG. 1 is a block diagram of a car computer according to an embodiment of the present disclosure.

Please refer to FIG. 1, wherein FIG. 1 is a block diagram of a car computer according to an embodiment of the present disclosure. The car computer A1 may be applied to various vehicles, especially self-driving vehicles. The car computer A1 includes a controller area network (CAN bus) 11 and a processing device 12. The CAN bus 11 is electrically connected to the processing device 12 or is in communication connection with the processing device 12. The processing device 12 may be a microcontroller, a programmable logic device or application-specific integrated circuit etc., one or more embodiments of the present disclosure is not limited thereto. The CAN bus 11 is configured to obtain driving data of a vehicle, and the processing device 12 is configured to determine whether four-wheel alignment of the vehicle is abnormal according to the driving data.

Figure 2:
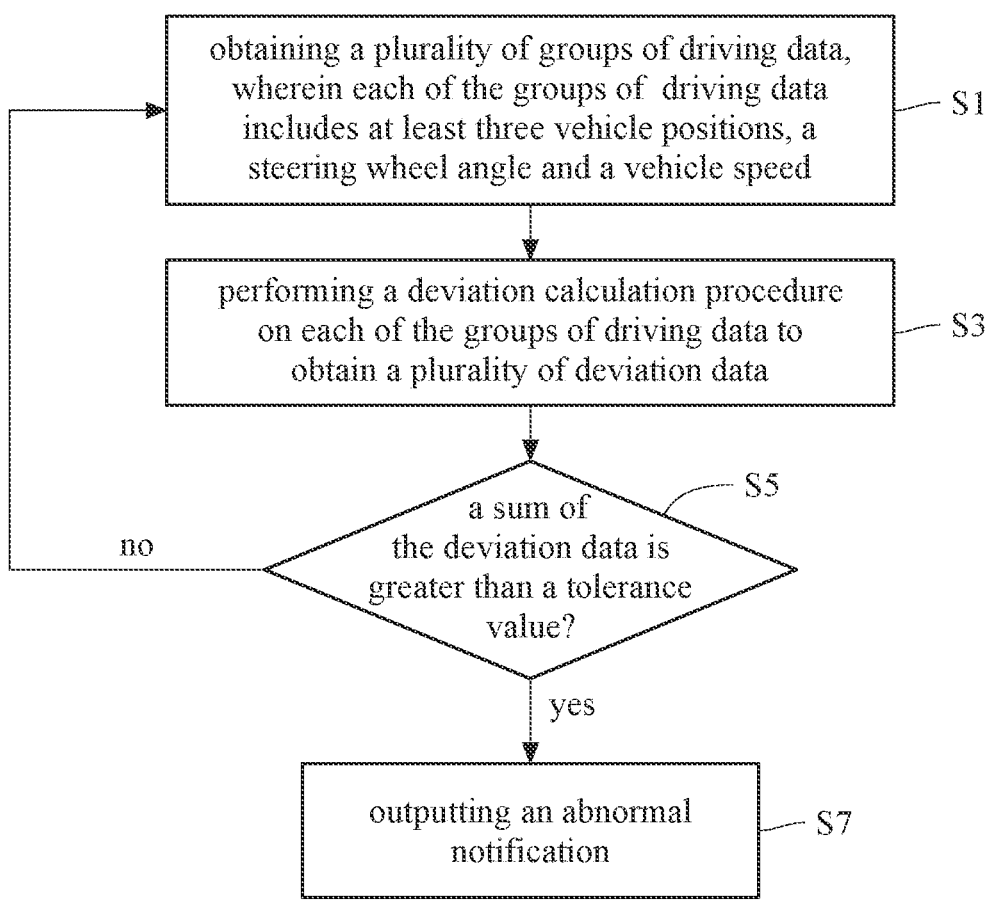
FIG. 2 is a flowchart of a vehicle positioning abnormality inspection method according to an embodiment of the present disclosure.

To explain determining whether four-wheel alignment of the vehicle is abnormal in more detail, please refer to both FIG. 1 and FIG. 2, wherein FIG. 2 is a flowchart of a vehicle positioning abnormality inspection method according to an embodiment of the present disclosure, and the vehicle positioning abnormality inspection method is performed by the processing device 12 shown in FIG. 1.

As shown in FIG. 2, the vehicle positioning abnormality inspection method includes: step S1: obtaining a plurality of groups of driving data, wherein each of the groups of driving data includes at least three vehicle positions, a steering wheel angle and a vehicle speed; step S3: performing a deviation calculation procedure on each of the groups of driving data to obtain a plurality of deviation data; step S5: determining whether a sum of the deviation data is greater than a tolerance value; in response to the result of step S5 is "yes", performing step S7: outputting an abnormal notification; and in response to the result of step S5 is "no", performing step S1.

In step S1, the CAN bus 11 is configured to obtain the groups of driving data from the vehicle, and the processing device 12 obtains the groups of driving data through the CAN bus 11, wherein the groups of driving data are preferably data generated in a chronological order. The CAN bus 11 may be in communication connection with a satellite positioning system to obtain a vehicle position, and the steering wheel angle and the vehicle speed may be obtained through the following means. Specifically, data frame of the CAN bus may have an identification (ID) information of 11 bits and data information of 8 bytes, wherein different ID corresponds to different vehicle information. Please refer to table 1 below, wherein table 1 is a data format of the CAN bus. For example, ID "0xB6" represents driving speed of the vehicle, and ID "0x10B" represents the steering wheel angle of the vehicle. Therefore, according to table 1, the processing device 12 may determine that data from bit 24 to bit 39 of ID "0xB6" in the data frame is data of the driving speed of the vehicle, and determine that data from bit 8 to bit 24 of ID "0x10B" in the data frame is data of the steering wheel angle of the vehicle. It should be noted that, table 1 only exemplarily shows data format of the CAN bus to explain method of obtaining the steering wheel angle and the vehicle speed of the driving data in more detail.

TABLE 1

| ID | CAN bus message | Start bit | Length (bit) | Value type | Initial value | Factor | Unit |
|---|---|---|---|---|---|---|---|
| 0xB6 | speed | 24 | 16 | Unsigned | 0 | 0.01 | km/h |
| 0x10B | steering wheel angle | 8 | 16 | Signed | 0 | 0.1 | Degree |

Then, in step S3, the processing device 12 performs the deviation calculation procedure on each of the groups of driving data to obtain the deviation data. After obtaining the deviation data of each group of driving data, in step S5, the processing device 12 determines whether a sum of the deviation data is greater than the tolerance value, to determine whether four-wheel alignment of the vehicle is deviated. The tolerance value indicates the value of the maximum allowed deviated distance, and may be set according to the total traveling distance of the vehicle. For example, assuming the total traveling distance of the vehicle determined based on the vehicle positions of the groups of driving data is 100 meters, the tolerance value may be set as 3 meters; assuming the total traveling distance of the vehicle determined based on the vehicle positions of the groups of driving data is 500 meters, the tolerance value may be set as 5 meters. In other words, the tolerance value may be greater when the total traveling distance is greater, but one or more embodiments of the present disclosure does not limit the specific method of setting the tolerance value.

In response to the result of step S5 is "no", it means the four-wheel alignment of the vehicle is normal, and the processing device 12 may perform step S1 again to continuously monitor the condition of the four-wheel alignment of the vehicle.

In response to the result of step S5 is "yes", it means the four-wheel alignment of the vehicle may be abnormal or malfunctioning, causing the accumulated deviation of the predicted positon to reach the tolerance value, wherein the predicted positon is generated according to parameters including the steering wheel angle and the target position obtained from the satellite positioning system. Therefore, in step S7, the processing device 12 outputs the abnormal notification, wherein the abnormal notification indicates the four-wheel alignment of the vehicle might be abnormal. Method of the processing device 12 outputting the abnormal notification may include: controlling an indicator of the vehicle to flash via the CAN bus 11, and/or outputting the abnormal notification to a cloud database or a server accessible to the user and/or the vehicle manufacturer. One or more embodiments of the present disclosure does not limit the method of the processing device 12 outputting the abnormal notification.

Figure 3:
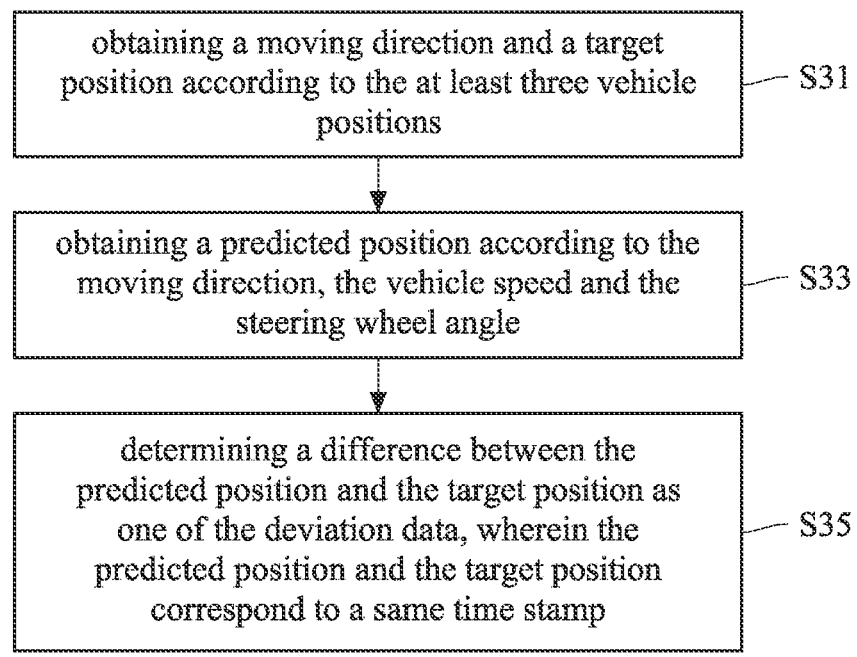
FIG. 3 is a detailed flowchart illustrating step S3 of FIG. 2.
Figure 4:
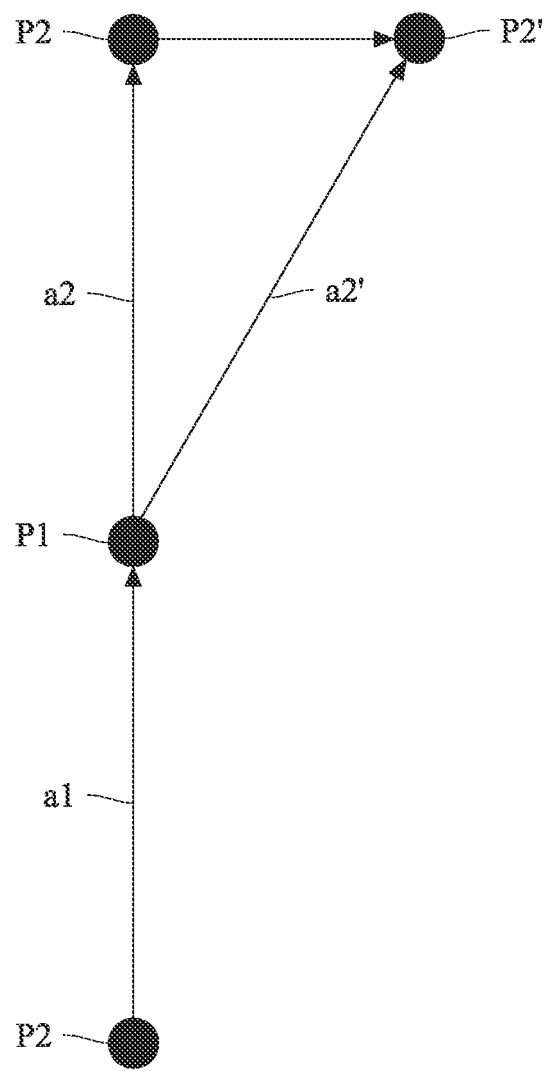
FIG. 4 is a schematic diagram illustrating a deviation calculation procedure according to an embodiment of the present disclosure.

To further elaborate the deviation calculation procedure, please further refer to FIG. 3 and FIG. 4, wherein FIG. 3 is a detailed flowchart illustrating step S3 of FIG. 2 (i.e. flowchart of the deviation calculation procedure), and FIG. 4 is a schematic diagram illustrating a deviation calculation procedure according to an embodiment of the present disclosure.

As shown in FIG. 3, step S3 of FIG. 2 includes: step S31: obtaining a moving direction and a target position according to the at least three vehicle positions; step S33: obtaining a predicted position according to the moving direction, the vehicle speed and the steering wheel angle; and step S35: determining a difference between the predicted position and the target position as one of the deviation data, wherein the predicted position and the target position correspond to a same time stamp.

In step S31, the processing device 12 obtains a moving direction a1 and a target position P2 according to a first vehicle position P0, a second vehicle position P1 and a third vehicle position P2, wherein the first vehicle position P0, the second vehicle position P1 and the target position P2 are positions of the vehicle, and the moving direction a1 is the travel direction of the vehicle. It should be noted that, the first vehicle position P0 corresponds to the first time stamp; the second vehicle position P1, the vehicle speed and the steering wheel angle correspond to the second time stamp; the target position P2 corresponds to the third time stamp; and the second time stamp is later than the first time stamp, and the third time stamp is later than the second time stamp. In short, the first vehicle position P0, the second vehicle position P1 and the target position P2 may be data generated in a chronological order. In addition, the processing device 12 may also obtain the moving direction and the target position according to the above three vehicle positions. For example, the processing device 12 may obtain the moving direction a1 according to more than two vehicle positions, and setting the vehicle position corresponding to the latest time stamp among the more than two vehicle positions as the target position P2.

In step S33, the processing device 12 obtains the predicted position P2' according to the moving direction a1, the vehicle speed and the steering wheel angle, wherein the predicted position P2' is the position where the processing device 12 predicts the vehicle will be at the third time stamp.

In step S35, the processing device 12 determines a difference between the predicted position P2' and the target position P2 as one piece of deviation data. The deviation data may be a deviation vector (distance with a direction) from the predicted position P2' to the target position P2, or a deviation vector (distance with a direction) from the target position P2 to the predicted position P2'.

Figure 5:
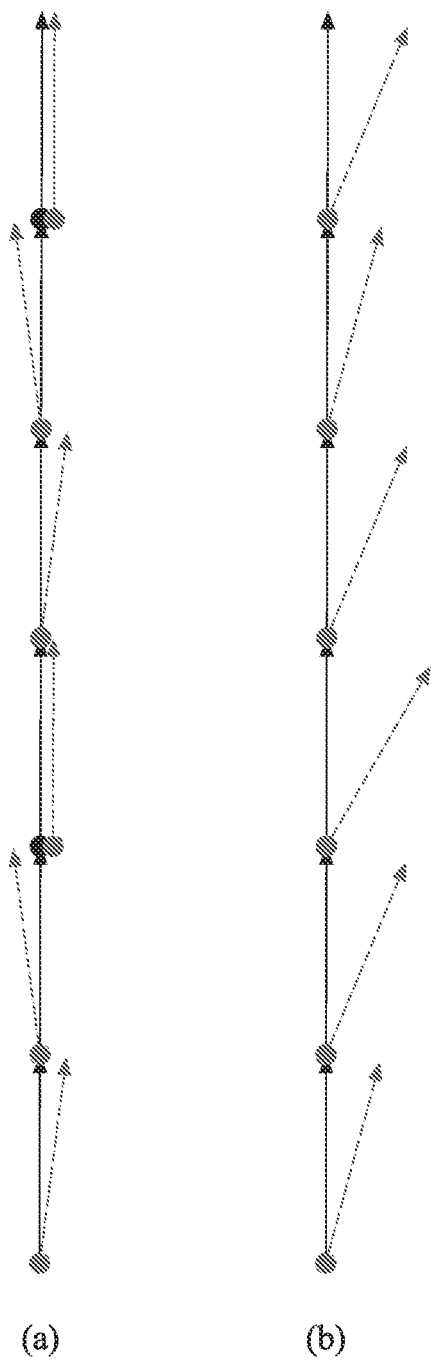
FIG. 5 includes part (a) and part (b), wherein part (a) illustrates normal vehicle travel direction and steering wheel direction, part (b) illustrates abnormal vehicle travel direction and steering wheel direction.

Take part (a) and part (b) of FIG. 5 as examples, wherein part (a) of FIG. 5 illustrates normal vehicle travel direction and steering wheel direction, part (b) of FIG. 5 illustrates abnormal vehicle travel direction and steering wheel direction. The solid arrows represent the actual travel direction of the vehicle, and the dashed arrows represent the travel direction indicated by the steering wheel angle.

In part (a), even though some of the directions indicated by the steering wheel angles are slightly shifted to the left and right, the vectors deviated to the left and right can be cancelled by each other, so that the overall direction indicated by the steering wheel angles is still approximately the same as the actual travel direction of the vehicle. Therefore, the processing device 12 may obtain a determination result that the deviation data between consecutive predicted positions and the corresponding target positions is not larger than the tolerance value (the result of step S5 in FIG. 2 is "no"). In part (b), the directions indicated by the steering wheel angles continuously to point to the right, the processing device 12 may determine a plurality of predicted positions that are located at the right side of the target positions, but the actual travel direction of the vehicle indicated by the corresponding target positions indicate is in a straight line. Therefore, the processing device 12 may obtain a determination result that the deviation data between consecutive predicted positions and the corresponding target positions is larger than the tolerance value (the result of step S5 in FIG. 2 is "yes").

Accordingly, a function of instant self-testing of the vehicle may be realized, and the abnormal notification is outputted when determining the four-wheel alignment of the vehicle is abnormal. Therefore, the driver and the manufacturer may determine the four-wheel alignment may be malfunctioning even before the vehicle is sent back to the manufacturer for regular inspection. Accordingly, safety benefits may be brought to the field of autonomous vehicles.

Figure 6:
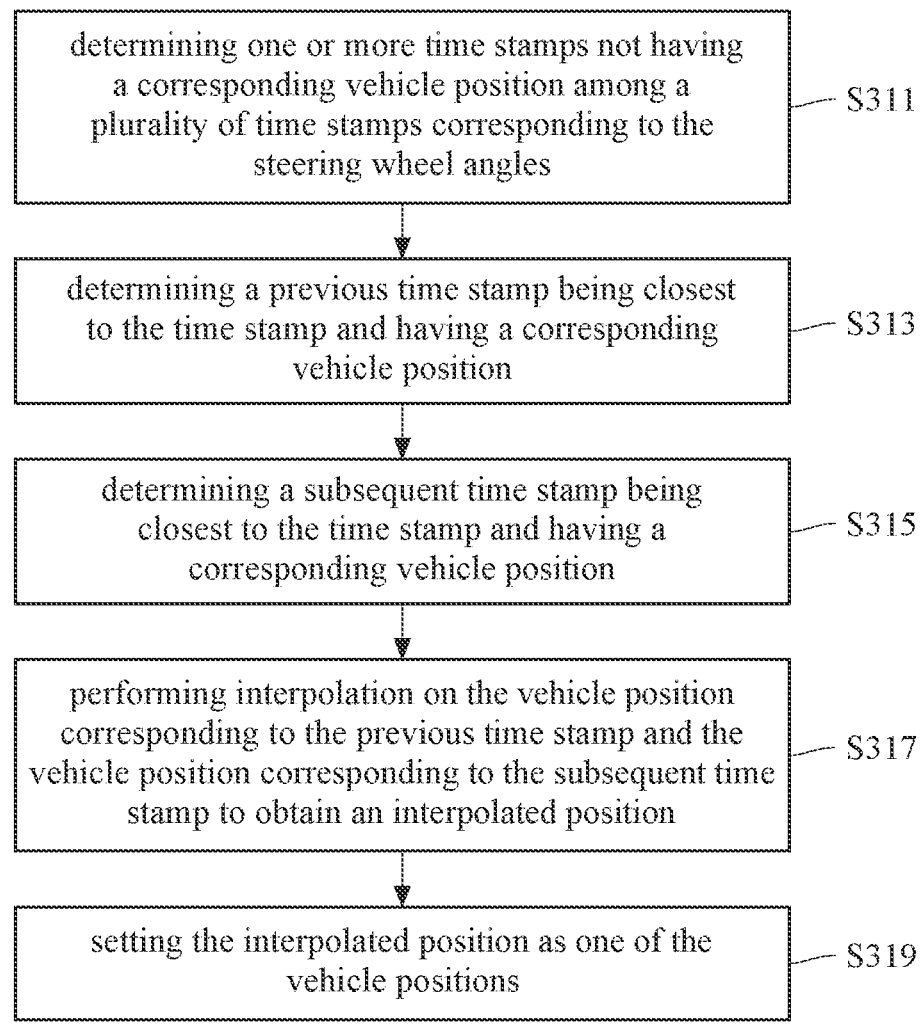
FIG. 6 is a detailed flowchart illustrating step S31 of FIG. 3.

Please refer to FIG. 6, wherein FIG. 6 is a detailed flowchart illustrating step S31 of FIG. 3. As shown in FIG. 6, step S31 may include: step S311: determining one or more time stamps not having a corresponding vehicle position among a plurality of time stamps corresponding to the steering wheel angles; step S313: determining a previous time stamp being closest to the time stamp and having a corresponding vehicle position; step S315: determining a subsequent time stamp being closest to the time stamp and having a corresponding vehicle position; step S317: performing interpolation on the vehicle position corresponding to the previous time stamp and the vehicle position corresponding to the subsequent time stamp to obtain an interpolated position; and step S319: setting the interpolated position as one of the vehicle positions.

The report rate of the satellite positioning system does not necessarily equal to the report rate of the steering wheel angle and/or the vehicle speed. For example, currently, common report rate of the satellite positioning system is about 1 Hz, and the report rate of the steering wheel angle and/or the vehicle speed is about 10 Hz. Therefore, in response to the report rate of the satellite positioning system is smaller than the report rate of the steering wheel angle and/or the vehicle speed, the processing device 12 may determine that among the time stamps corresponding to the steering wheel angles of the groups of driving data, one or more time stamps may not have a corresponding vehicle position data.

For each time stamp that does not have a corresponding vehicle position data, the processing device 12 performs steps S313 to S319. In steps S313 and S315, the processing device 12 determines the previous time stamp and the subsequent time stamp that have the corresponding vehicle positions and are the closest to the time stamp not having a corresponding vehicle position. In steps S317 and S319, the processing device 12 performs interpolation on the vehicle position of the previous time stamp and the vehicle position of the subsequent time stamp to obtain the interpolated position, and sets the interpolated position as the vehicle position of the time stamp not having a corresponding vehicle position, thereby compensating the missing vehicle position. In short, in steps S317 and S319, the processing device 12 may determine the previous time stamp and the subsequent time stamp that are next to said time stamp, and perform interpolation on the vehicle position of the previous time stamp and the vehicle position of the subsequent time stamp. Therefore, the processing device 12 may set the interpolated position as the vehicle position of the time stamp that is missing a vehicle position. It should be noted that, in FIG. 6, step S313 is illustrated to be performed before step S315, but step S315 may also be performed before step S313, or step S313 and step S315 may be simultaneously performed.

Figure 7:
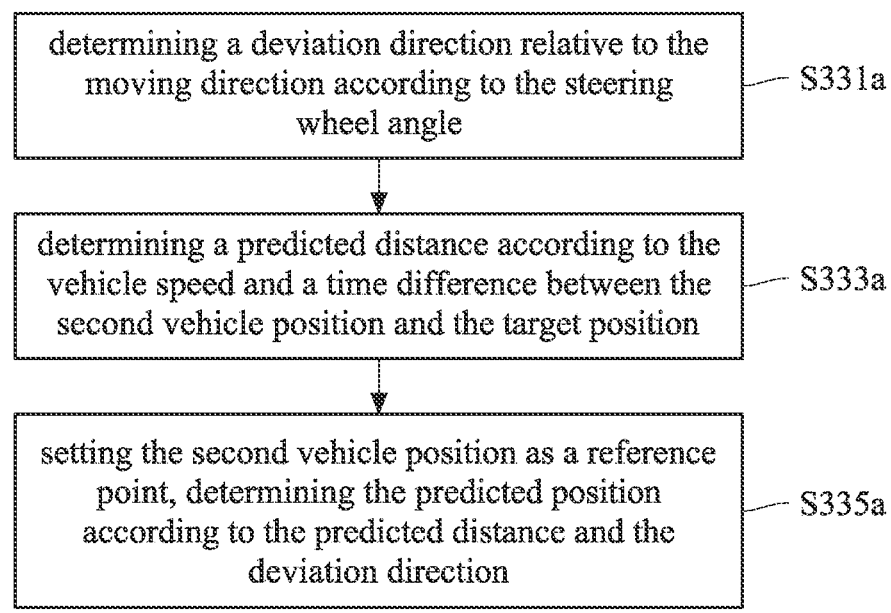
FIG. 7 is a detailed flowchart illustrating an embodiment of step S33 of FIG. 3.

Please refer to FIG. 7, wherein FIG. 7 is a detailed flowchart illustrating an embodiment of step S33 of FIG. 3. As shown in FIG. 7, step S33 may include: step S331a: determining a deviation direction relative to the moving direction according to the steering wheel angle; step S333a: determining a predicted distance according to the vehicle speed and a time difference between the second vehicle position and the target position; and step S335a: setting the second vehicle position as a reference point, determining the predicted position according to the predicted distance and the deviation direction.

Take FIG. 4 as an example, in step S331a, the processing device 12 first determines, according to the moving direction a1 from the first vehicle position P0 to the second vehicle position P1, that the vehicle will travel in the direction a2 from the second vehicle position P1 without turning the steering wheel; and then, according to the steering wheel angle, sets the moving direction a2 as the straight line direction to turn the moving direction a2 to the deviation direction a2' relative to the moving direction a1/a2. In step S333a, the processing device 12 determines the predicted distance of the vehicle departing from the second vehicle position P1 according to the time difference between the second vehicle position P1 and the target position P2. In step S335a, the processing device 12 sets the second vehicle position P1 as the reference point, and determines the predicted position P2' according to the deviation direction a2' and the predicted distance.

Figure 8:
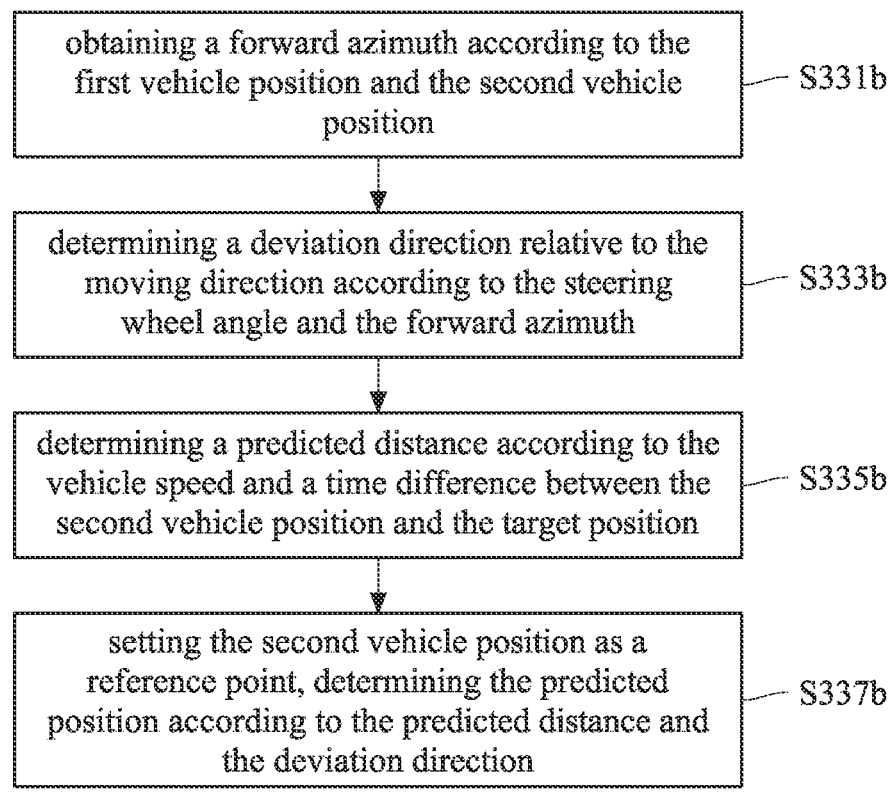
FIG. 8 is a detailed flowchart illustrating another embodiment of step S33 of FIG. 3.

Please refer to FIG. 8, wherein FIG. 8 is a detailed flowchart illustrating another embodiment of step S33 of FIG. 3. As shown in FIG. 8, step S33 may include: step S331b: obtaining a forward azimuth according to the first vehicle position and the second vehicle position; step S333b: determining a deviation direction relative to the moving direction according to the steering wheel angle and the forward azimuth; step S335b: determining a predicted distance according to the vehicle speed and a time difference between the second vehicle position and the target position;

and step S337b: setting the second vehicle position as a reference point, determining the predicted position according to the predicted distance and the deviation direction. Step S335b shown in FIG. 8 may be the same as step S333a shown in FIG. 7, the following does not repeat the details of step S335b shown in FIG. 8.

Take FIG. 4 as an example, in step S331b, the processing device 12 may obtain the forward azimuth according to the first vehicle position P0 and the second vehicle position P1, wherein the forward azimuth represents the angle from the first vehicle position P0 to the second vehicle position P1. Specifically, the processing device 12 may obtain the forward azimuth with the following equation (1):

$$\theta = a\tan 2(\sin \Delta\lambda \cdot \cos \varphi_1, \cos \varphi_0 \cdot \sin \varphi_1 - \sin \varphi_0 \cdot \cos \varphi_1 \cdot \cos \Delta\lambda) \quad [\text{equation (1)}]$$

wherein $\theta$ is the forward azimuth (clockwise from the north); $\varphi_0$ is the latitude of the first vehicle position P0; $\varphi_1$ is the latitude of the second vehicle position P1; $\Delta\lambda$ is a difference between the longitude of the first vehicle position P0 and the longitude of the second vehicle position P1.

In steps S333b and S335b, the processing device 12 sets a sum of the steering wheel angle and the forward azimuth $\theta$ as the deviation direction a2', and obtains the predicted distance.

In step S337b, the processing device 12 may determine the predicted position P2' according to the predicted distance and the deviation direction a2' through the following equation (2) and equation (3), wherein the deviation direction a2' is represented by "α" in equation (2) and equation (3):

$$\varphi_2 = \alpha \sin(\sin \varphi_1 \cdot \cos \delta + \cos \varphi_1 \cdot \sin \delta \cdot \cos \alpha) \quad [\text{equation (2)}]$$

$$\lambda_2 = \lambda_1 + a\tan 2(\sin \alpha \cdot \sin \delta \cdot \cos \varphi_1, \cos \delta - \sin \varphi_1 \cdot \sin \varphi_2) \quad [\text{equation (3)}]$$

wherein $\varphi_2$ is the latitude of the target position P2; $\lambda_2$ is the longitude of the target position P2; $\lambda_1$ is the longitude of the second vehicle position P1; α is the angle of the deviation direction a2'; δ is an angle, where δ=d/R, d is the predicted distance, and R is earth radius.

Accordingly, the processing device 12 may obtain a more accurate predicted position P2'.

Figure 9:
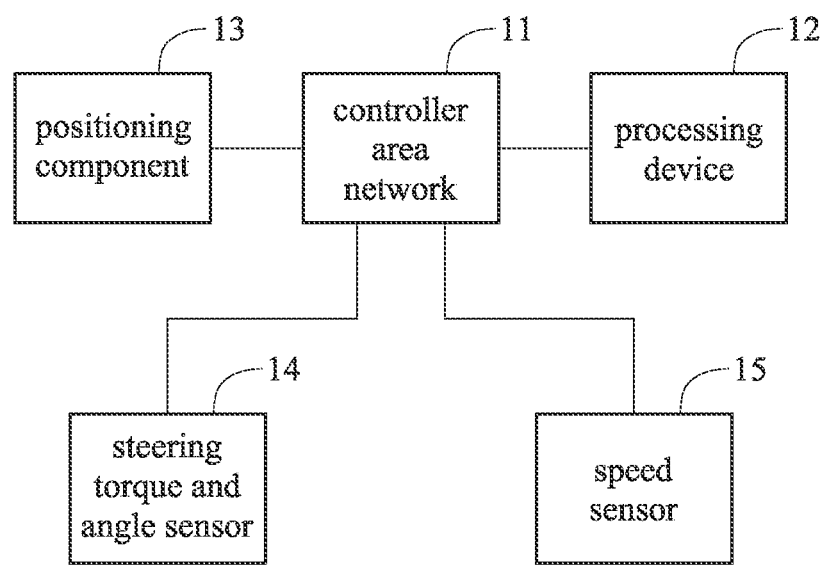
FIG. 9 is a block diagram of a car computer according to another embodiment of the present disclosure and other vehicle components connected to the car computer.

Please refer to FIG. 9, wherein FIG. 9 is a block diagram of a car computer according to another embodiment of the present disclosure and other vehicle components connected to the car computer. The car computer A2 includes the CAN bus 11, the processing device 12, a positioning component 13, a steering torque and angle sensor 14 and a speed sensor 15, wherein the CAN bus 11 and the processing device 12 of the car computer A2 may be the same as the CAN bus 11 and the processing device 12 of the car computer A1 shown in FIG. 1, respectively, and the positioning component 13, the steering torque and angle sensor 14 and the speed sensor 15 are components selectively disposed. In addition, as shown in FIG. 9, the CAN bus 11 may be electrically connected to the steering torque and angle sensor 14 to obtain the steering wheel angle, and the CAN bus 11 may be electrically connected to or in communication connection with the speed sensor 15 to obtain the vehicle speed.

The positioning component 13 may be electrically connected to the CAN bus 11 or in communication connection with the CAN bus 11, to be connected to the processing device 12 through the CAN bus 11. The positioning component 13 may be a module of the satellite positioning system as described above, such as global navigation satellite system (GNSS), global positioning system (GPS), Russian satellite navigation system (GLONASS), Galileo positioning system or BeiDou navigation satellite system (BDS) etc. The processing device 12 may obtain the vehicle position through the positioning performed by the positioning component 13, and thereby determining whether the amount of data (the vehicle position) obtained is enough to perform one or more embodiments of the vehicle positioning abnormality inspection method of as described above.

Figure 10:
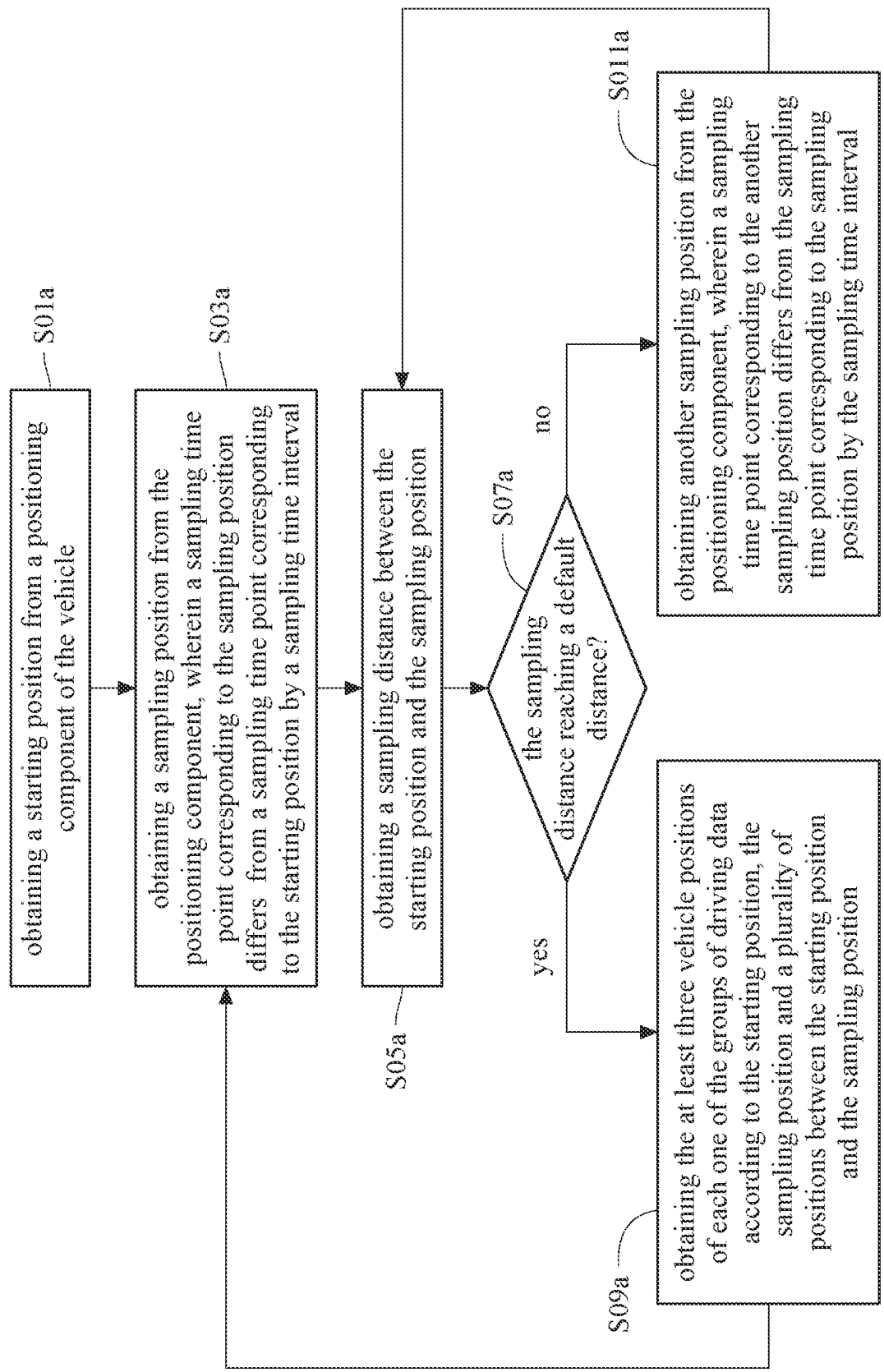
FIG. 10 is a flowchart of a vehicle positioning abnormality inspection method according to another embodiment of the present disclosure.

To further elaborate the embodiment of the processing device 12 determining whether the amount of data is enough, please refer to FIG. 9 and FIG. 10, wherein FIG. 10 is a flowchart of a vehicle positioning abnormality inspection method according to another embodiment of the present disclosure. As shown in FIG. 10, before performing step S1 of step S3 of FIG. 2, the processing device 12 may further perform: step S01a: obtaining a starting position from a positioning component of the vehicle; step S03a: obtaining a sampling position from the positioning component, wherein a sampling time point corresponding to the sampling position differs from a sampling time point corresponding to the starting position by a sampling time interval; step S05a: obtaining a sampling distance between the starting position and the sampling position; step S07a: determining whether the sampling distance reaching a default distance; in response to the result of step S07a is "yes", performing step S09a: obtaining the at least three vehicle positions of each one of the groups of driving data according to the starting position, the sampling position and a plurality of positions between the starting position and the sampling position; and in response to the result of step S07a is "no", performing step S011a: obtaining another sampling position from the positioning component, wherein a sampling time point corresponding to the another sampling position differs from the sampling time point corresponding to the sampling position by the sampling time interval.

In step S01a, the processing device 12 obtains positioning data from the positioning component 13 of the vehicle to set the positioning data as the starting position. In step S03a, the processing device 12 obtains another piece of positioning data from the positioning component 13 of the vehicle to set the another piece of positioning data as the sampling position, wherein the difference between the sampling time point corresponding to the sampling position and the sampling time point corresponding to the starting position is the sampling time interval. The sampling time interval depends on the report rate of the satellite positioning system as described above. The sampling time point is the time point of the positioning component 13 generating the starting position/the sampling position. In other words, the higher the report rate of the satellite positioning system is, the shorter the sampling time interval is, and the present disclosure does not limit the actual value of the sampling time interval. In short, in step S01a and step S03a, the processing device 12 sets the first positioning data as the starting position, and the positioning data obtained after said first positioning data is used as the sampling position.

Then, the processing device 12 performs a distance determination procedure, wherein the distance determination procedure includes step S05a and step S07a. In step S05a, the processing device 12 calculates a sampling distance between the starting position and the sampling position (referred to as "first sampling position" hereinafter), and performs the distance determination procedure. In step S07a, the processing device 12 determines whether the sampling distance is equal to or greater than the default distance, wherein the default distance is, for example, 500 meters or 1000 meters, but the present disclosure is not limited thereto.

In response to the sampling distance is equal to or greater than the default distance, it means the starting position, the first sampling position as well as a plurality of positions between the starting position and the first sampling position corresponding to this the sampling distance is enough to determine an accurate predicted position. Therefore, in step S09a, the processing device 12 may obtain the at least three vehicle positions of each one of the groups of driving data according to the starting position, the first sampling position as well as the positions between the starting position and the first sampling position. Then, the processing device 12 may perform step S03a again.

In response to the sampling distance is not equal to and not greater than the default distance, it means the starting position, the first sampling position as well as a plurality of positions between the starting position and the first sampling position corresponding to this sampling distance are still not enough to determine an accurate predicted position. Therefore, in step S011a, the processing device 12 may obtain another sampling position (referred to as "second sampling position" hereinafter) from the positioning component 13, wherein a difference between the sampling time point corresponding to the second sampling position and the sampling time point of the first sampling position is also the sampling time interval, and the sampling time point corresponding to the second sampling position is later than the sampling time point of the first sampling position. Then, the processing device 12 may perform the distance determination procedure again.

In short, in response to in step S07a, the processing device 12 determines that the sampling distance reaches the default distance, the processing device 12 sets all of the positions as the obtained vehicle positions of the driving data; if, in step S07a, the processing device 12 determines that the sampling distance does not reach the default distance, the processing device 12 obtains another sampling position from the positioning component 13, until a distance between the starting position and a sampling position reaches the default distance.

Figure 11:
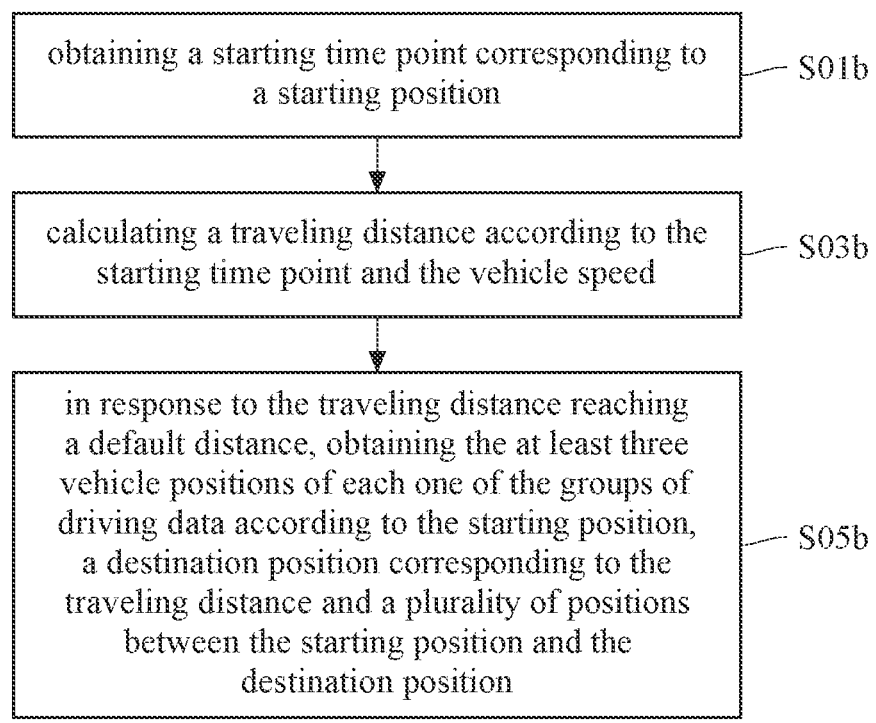
FIG. 11 is a flowchart of a vehicle positioning abnormality inspection method according to yet another embodiment of the present disclosure.

To further elaborate another embodiment of the processing device 12 determining whether the amount of data is enough, please refer to FIG. 1/FIG. 9 and FIG. 11, wherein FIG. 11 is a flowchart of a vehicle positioning abnormality inspection method according to yet another embodiment of the present disclosure. As shown in FIG. 11, before performing step S1 or step S3 of FIG. 3, the processing device 12 may further perform: step S01b: obtaining a starting time point corresponding to a starting position; step S03b: calculating a traveling distance according to the starting time point and the vehicle speed; and step S05b: in response to the traveling distance reaching a default distance, obtaining the at least three vehicle positions of each one of the groups of driving data according to the starting position, a destination position corresponding to the traveling distance and a plurality of positions between the starting position and the destination position.

In step S01b, the processing device 12 may obtain the starting time point corresponding to the starting position, wherein the starting time point is the time point of the satellite positioning system generating the starting position, and the processing device 12 may obtain the starting position from the positioning component 13. In step S03b, the processing device 12 may calculate the traveling distance of the vehicle departing from the starting position according to the starting time point and the vehicle speed obtained from the CAN bus 11. In step S05b, the processing device 12 may continuously calculate the traveling distance through the current positioning on the vehicle. When the processing device 12 determines that the traveling distance is equal to or greater than the default distance, the processing device 12 obtains the at least three vehicle positions of each one of the groups of driving data according to the starting position, the destination position corresponding to the traveling distance as well as the positions between the destination position and the starting position.

It should be noted that, assuming the positions between the starting position and the sampling position (or the destination position) are first position to fourth position, the processing device 12 may set the starting position, the first position and the second position as the three vehicle positions of one group of the driving data, and set the first position, the second position and the third position as the three vehicle positions of another group of the driving data, and so on. Or, the processing device 12 may set the starting position, the first position and the second position as the three vehicle positions of one group of the driving data, and set the third position, the fourth position and the sampling position (or the destination position) as the three vehicle positions of another group of the driving data.

In view of the above, the vehicle positioning abnormality inspection method and car computer according to one or more embodiments of the present disclosure may realize a function of instant self-testing of the vehicle, and an abnormal notification is outputted when determining the four-wheel alignment of the vehicle is abnormal. Therefore, safety benefits may be brought to the field of autonomous vehicles. In addition, by the embodiment of determining whether data amount is enough before determining the predicted position, the predicted position may be more accurate, to avoid the car computer from sending the abnormal notification by mistake.

What is claimed is:

1. A vehicle positioning abnormality inspection method, performed by a processing device, comprising:
   obtaining a plurality of groups of driving data, wherein each of the groups of driving data includes at least three vehicle positions, a steering wheel angle and a vehicle speed;
   performing a deviation calculation procedure on each of the groups of driving data to obtain a plurality of deviation data; and
   in response to a sum of the plurality of deviation data greater than a tolerance value, outputting an abnormal notification by controlling an indicator of a vehicle to flash via a controller area network (CAN) bus,
   wherein the deviation calculation procedure comprises:
      obtaining a predicted position according to a moving direction, the vehicle speed and the steering wheel angle; and
      determining a difference between the predicted position and a target position as one of the plurality of deviation data, wherein the predicted position and the target position correspond to a same time stamp,
   wherein determining the difference between the predicted position and the target position of the vehicle comprises:
      determining a deviation vector between the predicted position and the target position; and
      setting the deviation vector as the plurality of deviation data.

2. The vehicle positioning abnormality inspection method according to claim 1, wherein the deviation calculation procedure further comprises:

obtaining the moving direction according to the at least three vehicle positions; and selecting one of the at least three vehicle positions as the target position.

3. The vehicle positioning abnormality inspection method according to claim 2, wherein the at least three vehicle positions comprise a first vehicle position, a second vehicle position and the target position, the first vehicle position corresponds to a first time stamp, the second vehicle position, the vehicle speed and the steering wheel angle correspond to a second time stamp, and the predicted position and the target position correspond to a third time stamp; and wherein the third time stamp is later than the second time stamp, and the second time stamp is later than the first time stamp.

4. The vehicle positioning abnormality inspection method according to claim 2, wherein the at least three vehicle positions comprise a first vehicle position, a second vehicle position following the first vehicle position and the target position, the moving direction is a direction from the first vehicle position to the second vehicle position, and obtaining the predicted position according to the moving direction, the vehicle speed and the steering wheel angle comprises:

determining a deviation direction relative to the moving direction according to the steering wheel angle;

determining a predicted distance according to the vehicle speed and a time difference between the second vehicle position and the target position; and setting the second vehicle position as a reference point, determining the predicted position according to the predicted distance and the deviation direction.

5. The vehicle positioning abnormality inspection method according to claim 2, wherein the at least three vehicle positions comprise a first vehicle position, a second vehicle position following the first vehicle position and the target position, the moving direction is a direction from the first vehicle position to the second vehicle position, and obtaining the predicted position according to the moving direction, the vehicle speed and the steering wheel angle comprises:

obtaining a forward azimuth according to the first vehicle position and the second vehicle position;

determining a deviation direction relative to the moving direction according to the steering wheel angle and the forward azimuth;

determining a predicted distance according to the vehicle speed and a time difference between the second vehicle position and the target position; and setting the second vehicle position as a reference point, determining the predicted position according to the predicted distance and the deviation direction.

6. The vehicle positioning abnormality inspection method according to claim 5, wherein determining the deviation direction relative to the moving direction according to the steering wheel angle and the forward azimuth comprises:

setting a sum of the steering wheel angle and the forward azimuth as the deviation direction.

7. The vehicle positioning abnormality inspection method according to claim 2, wherein before performing the deviation calculation procedure on each of the groups of driving data of a vehicle, the vehicle positioning abnormality inspection method further comprises:

obtaining a starting position from a positioning component of the vehicle;

obtaining a sampling position from the positioning component, wherein a sampling time point corresponding to the sampling position differs from a sampling time point corresponding to the starting position by a sampling time interval;

performing a distance determination procedure, wherein the distance determination procedure comprises:

obtaining a sampling distance between the starting position and the sampling position; and determining whether the sampling distance reaching a default distance;

obtaining the at least three vehicle positions of each one of the groups of driving data according to the starting position, the sampling position and a plurality of positions between the starting position and the sampling position in response to the sampling distance reaches the default distance; and obtaining another sampling position from the positioning component to perform the distance determination procedure again in response to the sampling distance does not reach the default distance, wherein a sampling time point corresponding to the another sampling position differs from the sampling time point corresponding to the sampling position by the sampling time interval.

8. The vehicle positioning abnormality inspection method according to claim 2, wherein before performing the deviation calculation procedure on each of the groups of driving data, the vehicle positioning abnormality inspection method further comprises:

obtaining a starting time point corresponding to a starting position;

calculating a traveling distance according to the starting time point and the vehicle speed; and in response to the traveling distance reaching a default distance, obtaining the at least three vehicle positions of each one of the groups of driving data according to the starting position, a destination position corresponding to the traveling distance and a plurality of positions between the starting position and the destination position.

9. The vehicle positioning abnormality inspection method according to claim 2, wherein obtaining the moving direction according to the at least three vehicle positions comprises:

determining one or more time stamps not having a corresponding vehicle position among a plurality of time stamps corresponding to the steering wheel angles; and on each of the one or more time stamps, performing:

determining a previous time stamp being closest to the time stamp and having a corresponding vehicle position;

determining a subsequent time stamp being closest to the time stamp and having a corresponding vehicle position;

performing interpolation on the vehicle position corresponding to the previous time stamp and the vehicle position corresponding to the subsequent time stamp to obtain an interpolated position; and setting the interpolated position as one of the vehicle positions.

10. A car computer, comprising:

a controller area network, configured to obtain a plurality of groups of driving data; wherein each of the groups of driving data includes at least three vehicle positions, a steering wheel angle and a vehicle speed; and a processing device, connected to the controller area network; wherein the processing device is configured to obtain the groups of driving data from the controller area network, perform a deviation calculation procedure on each of the groups of driving data to obtain a plurality of deviation data; and in response to a sum of the plurality of deviation data greater than a tolerance value, the processing device outputs an abnormal notification by controlling an indicator of a vehicle to flash via a controller area network (CAN) bus, wherein the deviation calculation procedure comprises:
obtaining a predicted position according to a moving direction, the vehicle speed and the steering wheel angle; and
determining a difference between the predicted position and a target position as one of the plurality of deviation data, wherein the predicted position and the target position correspond to a same time stamp,
wherein the processing device performing determining the difference between the predicted position and the target position of the vehicle comprises:
determining a deviation vector between the predicted position and the target position; and
setting the deviation vector as the plurality of deviation data.

11. The car computer according to claim 10, wherein the deviation calculation procedure further comprises:
obtaining the moving direction according to the at least three vehicle positions; and
selecting one of the at least three vehicle positions as the target position.

12. The car computer according to claim 11, wherein the at least three vehicle positions comprise a first vehicle position, a second vehicle position and the target position, the first vehicle position corresponds to a first time stamp, the second vehicle position, the vehicle speed and the steering wheel angle correspond to a second time stamp, and the predicted position and the target position correspond to a third time stamp; and
wherein the third time stamp is later than the second time stamp, and the second time stamp is later than the first time stamp.

13. The car computer according to claim 11, wherein the at least three vehicle positions comprise a first vehicle position, a second vehicle position following the first vehicle position and the target position, the moving direction is a direction from the first vehicle position to the second vehicle position, and the processing device performing obtaining the predicted position according to the moving direction, the vehicle speed and the steering wheel angle comprises:
determining a deviation direction relative to the moving direction according to the steering wheel angle;
determining a predicted distance according to the vehicle speed and a time difference between the second vehicle position and the target position; and
setting the second vehicle position as a reference point, determining the predicted position according to the predicted distance and the deviation direction.

14. The car computer according to claim 11, wherein the at least three vehicle positions comprise a first vehicle position, a second vehicle position following the first vehicle position and the target position, the moving direction is a direction from the first vehicle position to the second vehicle position, and the processing device performing obtaining the predicted position according to the moving direction, the vehicle speed and the steering wheel angle comprises:
obtaining a forward azimuth according to the first vehicle position and the second vehicle position;
determining a deviation direction relative to the moving direction according to the steering wheel angle and the forward azimuth;
determining a predicted distance according to the vehicle speed and a time difference between the second vehicle position and the target position; and
setting the second vehicle position as a reference point, determining the predicted position according to the predicted distance and the deviation direction.

15. The car computer according to claim 14, wherein the processing device performing determining the deviation direction relative to the moving direction according to the steering wheel angle and the forward azimuth comprises:
setting a sum of the steering wheel angle and the forward azimuth as the deviation direction.

16. The car computer according to claim 11, further comprising a positioning component connected to the processing device, the positioning component is configured to obtain a starting position and a sampling position, wherein before performing the deviation calculation procedure on each of the groups of driving data of a vehicle, the processing device is further configured to perform:
obtaining the starting position from the positioning component of the vehicle;
obtaining the sampling position from the positioning component, wherein a sampling time point corresponding to the sampling position differs from a sampling time point corresponding to the starting position by a sampling time interval;
performing a distance determination procedure, wherein the distance determination procedure comprises:
obtaining a sampling distance between the starting position and the sampling position; and
determining whether the sampling distance reaching a default distance;
obtaining the at least three vehicle positions of each one of the groups of driving data according to the starting position, the sampling position and a plurality of positions between the starting position and the sampling position in response to the sampling distance reaches the default distance; and
obtaining another sampling position from the positioning component to perform the distance determination procedure again in response to the sampling distance does not reach the default distance, wherein a sampling time point corresponding to the another sampling position differs from the sampling time point corresponding to the sampling position by the sampling time interval.

17. The car computer according to claim 11, wherein before performing the deviation calculation procedure on each of the groups of driving data, the processing device is further configured to perform:
obtaining a starting time point corresponding to a starting position;
calculating a traveling distance according to the starting time point and the vehicle speed; and
in response to the traveling distance reaching a default distance, obtaining the at least three vehicle positions of each one of the groups of driving data according to the starting position, a destination position corresponding to the traveling distance and a plurality of positions between the starting position and the destination position.

18. The car computer according to claim 11, wherein the processing device performing obtaining the moving direction according to the at least three vehicle positions comprises:
determining one or more time stamps not having a corresponding vehicle position among a plurality of time stamps corresponding to the steering wheel angles; and on each of the one or more time stamps, performing:
  determining a previous time stamp being closest to the time stamp and having a corresponding vehicle position;
  determining a subsequent time stamp being closest to the time stamp and having a corresponding vehicle position;
  performing interpolation on the vehicle position corresponding to the previous time stamp and the vehicle position corresponding to the subsequent time stamp to obtain an interpolated position; and
  using the interpolated position as one of the vehicle positions.

* * * * *